Sept. 21, 1971     H. LEITER     3,606,798
CARRIAGE APPARATUS FOR SCANNING MEANS
Original Filed April 6, 1965     4 Sheets-Sheet 1

INVENTOR
HARRY LEITER
BY Jacob Trachtman
ATTORNEY Sept. 21, 1971 H. LEITER 3,606,798
CARRIAGE APPARATUS FOR SCANNING MEANS
Original Filed April 6, 1965 4 Sheets-Sheet 2

INVENTOR
HARRY LEITER
BY *Jacob Trachtman*
ATTORNEY

INVENTOR
HARRY LEITER

BY Jacob Nachtman
ATTORNEY

Sept. 21, 1971     H. LEITER     3,606,798
CARRIAGE APPARATUS FOR SCANNING MEANS
Original Filed April 6, 1965     4 Sheets-Sheet 4

INVENTOR.
HARRY LEITER
BY Jacob Jachtman
ATTORNEY

United States Patent Office 3,606,798
Patented Sept. 21, 1971

3,606,798
CARRIAGE APPARATUS FOR SCANNING MEANS
Harry Leiter, Lower Merion Township, Montgomery County, Pa. (107 Henley Road, Philadelphia, Pa. 19151)
Original application Apr. 6, 1965, Ser. No. 445,959, now Patent No. 3,465,145, dated Sept. 2, 1969. Divided and this application June 20, 1968, Ser. No. 791,197
Int. Cl. F16h 27/02
U.S. Cl. 74—112                                                    7 Claims

ABSTRACT OF THE DISCLOSURE

Means for recording data corresponding to the distribution and concentration of radio active sources detected over a scanning region together with means for converting said recorded data into a visual display at any desired time and as often as may be required. A scintillation detector is mounted for linear movement in opposite directions along a carriage which is itself mounted for linear movement in opposite directions orthogonal to the directions of movement of the scintillation detector, the carriage being actuated to move the detector to the next adjacent scanning line during the reversal of scanning direction. Output signals from the detector are routed to signal processing means, and after processing, data is recorded on one track of a magnetic tape while control signals generated at the end of each scan are recorded on another track of the magnetic tape. The read out apparatus may include an intensity modulated light source secured on a carriage for rectilinear movement in opposite directions at a constant speed to cause the modulated light beam to traverse an underlying photographic film, while the carriage itself is also shiftable in a direction along a line orthogonal to the scanning motion of the light source so that movements of the light source may duplicate those of the radiation detector scanning device. The recorded signal may be adjusted to provide an output for producing the required exposure of the film avoiding a new scanning operation over the radiation source for obtaining adjustments in the exposure to provide the required information in a photographic record or in the display of the information on a cathode ray tube face.

---

This is a divisional application of my co-pending application, Ser. No. 455,959 filed Apr. 6, 1965 now Patent No. 3,465,145 issued Sept. 2, 1969 and entitled Scanning and Recording Means for Detecting Radioactive Distributions.

This invention relates generally to scanning and recording means, and more particularly relates to means for recording data corresponding to the distribution and concentration of radioactive sources detected over a scanned region together with means for converting such recorded data into a visual display at any desired time and as often as may be required.

One of the present medical techniques employed for location of malignant growths in animals, and particularly in human beings, is the radioactive isotope tracer technique. In application of this technique, a quantity of a radioactive isotope in suitable form is introduced into the body of the patient, whereupon the isotope concentrates in the regions of malignancy with the greatest degree of isotope concentration in those regions of the body where the malignancy is most pronounced. The technique is frequently employed for the detection of glandular malignancies, as for example in the thyroid, liver and spleen.

After the isotope has been administered to the patient and a prescribed time has elapsed sufficient to cause concentration of the isotope in the malignant areas, a radiation detector is moved in scanning fashion over the area of suspected malignancy, and an output signal is generated as a series of pulses occurring at rates which vary in accordance with the concentration of isotope at the point being then scanned, higher isotope concentrations generating pulse trains of high repetition rate while low concentrations generate pulses occurring at slower rates.

In the past, the signals generated by the radiation detector have been electrically processed and used to intensity modulate a light source which in turn variably exposes a photographic film over which it is being moved in synchronism with the movements of the scanning radiation detector to variably expose the film and produce a photographic record corresponding to the variations in isotope concentrations in the scanned area. The exposed film is then processed to provide a permanent record of the distribution and concentration of the malignancy in the scanned area, in effect providing a map which may be used in determining the need for and method of carrying out surgical procedures of the affected region.

Unfortunately, unusable or highly questionable photographic exposures sometimes occur which renders the resulting photographs substantially worthless for all practical purposes. Since the photographic results are not available immediately, by the time the unsatisfactory result is established it is too late to carry out a second scan with any accuracy of result due to fall off in radioactivity of the isotope material. Consequently, the patient must again be given a dose of the isotope material and the entire procedure must be repeated, but the repetition of the procedure must be delayed to permit sufficient reduction in background radiation due to the first procedure to preclude obscuring the results of the second test. Valuable time is thus irretrievably lost, and there is of course no guarantee that satisfactory results will be obtained during the second procedure.

The present invention eliminates the aforedescribed problem by providing means for processing and permanently storing in recoverable form the data signal information generated by the radiation detector apparatus, and utilizing the data signals with a non-destructive read out system to provide a visual display from which, if desired, a permanent photographic record may be made. Should the photographic record turn out to be improperly exposed, the data is still available for reuse and a new exposure may be made with suitable compensation to provide the desired result. There is therefore, no need to repeat the administration of radioactive isotope to the patient, since the desired data once obtained may be repeatedly processed to provide a satisfactory usable display.

Briefly, the apparatus according to the invention, contemplates a patient scanning data processing system including an information storage device, and a read out or playback system in which the stored data is utilized to produce a permanent record, which may be for example in the form of an exposed photographphic film. The scanning radiation detection apparatus broadly includes a scintillation detector mounted for linear movement in opposite directions along a carriage which latter is itself mounted for linear movement in opposite directions orthogonal to the directions of movement of the scintillation detector, specific means being provided for moving the scintillation detector at a constant scanning speed and for reversing its direction at the end of each scan. During the reversal of scanning direction the carriage is actuated to move the detector to the next adjacent scanning line. The output signals from the scintillation detector are routed to signal processing means, and after processing, the data is recorded on one track of a magnetic tape while control signals generated at the end of each scan are recorded on another track of the magnetic tape.

The playback or read out apparatus for producing the visual data display may take several forms, two of which are disclosed hereinafter. In one form, the read out apparatus may include an intensity modulated light source secured on a carriage for rectilinear movement in opposite directions at a constant speed to cause the modulated light beam to traverse an underlying photographic film. The carriage itself is also shiftable in opposite directions along a line orthogonal to the scanning motion of the light source so that the movements of the light source may duplicate those of the radiation detector scanning device. Control means responsive to the control signals pre-recorded on the magnetic tape are provided to control the direction of movement of the scanning light source and the direction and occurrence of carriage movement to shift the light source from one scanning line to the next. An alternate arrangement provides a display on a cathode ray tube face which may also be used to expose a photographic film. Variable exposure of the film is obtained by intensity modulation of the cathode ray tube beam by the stored data, while scanning movement of the beam is provided by apparatus controlled by the stored control signals.

From the foregoing it will be appreciated that a primary object of my invention is to provide a novel system for detecting, storing and displaying data signals generated by the temporary deposition of radioactive material in malignant tissue which insures that the desired data is available in usable form and thereby eliminates the possibility of data loss requiring repetition of the testing procedure and resulting in undesirable multiple exposure of the patient in radioactive material.

Another object of my invention is the implementation of the aforesaid system by providing data collection apparatus including signal generating radiation detector means, control signal generating means, and apparatus for storing in recoverable form the generated data and control signals.

Still another object of my invention is to provide a novel system and data collecting apparatus as aforesaid which further includes data display apparatus responsive to data and control signals recoverable from the signal storage part of the data recording apparatus effective to produce a visual display corresponding point by point to the concentration of radioactive material in the area scanned by the radiation detector portion of the data collecting apparatus.

A further object of my invention is to provide a novel system of data collection and display as aforesaid wherein the signal storage apparatus includes means for recording the data and control signals on a magnetic medium together with a provision for a non-destructive signal read out so that the stored data may be repetitively read out of the storage apparatus if desired.

The foregoing and other objects of my invention will become clear from a reading of the following specification in conjunction with an examination of the appended drawings, wherein.

In the several figures, like elements are denoted by like reference characters.

Turning now to the figures, consider first the radiation detection scanning apparatus shown in FIGS. 1 to 4. The scanning apparatus designated generally as 20 includes a rectangular support frame comprising a pair of spaced apart parallel L-shaped angle members 21 and 22 inverted so that one leg of each member is horizontally coplanar with a corresponding leg of the other member. Seated flatwise upon the horizontal legs of the angle members 21 and 22 at substantially opposite ends thereof are a second pair of spaced apart parallel L-shaped angle members 23 and 24, the members 23 and 24 being rigidly secured to the underlying members 21 and 22 by means of bolts or screws 25. Members 23 and 24 are positioned so that their vertically extending legs are disposed in facing relationship and have formed along their longitudinally extending upper edges toothed rack formations 26 and 27 respectively.

As best seen from FIG. 2, each rack tooth 28 is provided with a camming face 29 engageable by the identically inclined camming face 30 formed on the end of finger 31 carried by shift bar 32 to be described more fully hereinafter. Shift bar 32 is provided at its opposite end with a second finger 33 also having a camming face adapted for engagement with the teeth of rack 27, finger 33 being illustrated in free fitting close disposition between a pair of adjacent teeth of the rack 27. As will be seen, it is the shift bar 32 in conjunction with the racks 26 and 27 which provides the stepped motion of the detector device to move the latter from one scanning line to the next.

Extending between and secured to the vertically extending flanges of angle members 21 and 22 are a pair of spaced parallel cylindrical shafts 34 and 35. Disposed freely slidably upon the shafts 34 and 35 respectively is a carriage comprising support blocks 36 and 37. Extending between and fixedly secured to the slide blocks are upper and lower parallel cylindrical shafts 38 and 39 of said carriage. Slidably disposed upon the shafts 38 and 39 for movement in opposite directions therealong is a carrier member or block 40 to which is secured for movement therewith a radiation detector device 41 which may typically be a scintillation counter type of detector. Positioned parallel to the shaft 38 in above-lying relation thereto and supported at opposite ends on the upper faces of carriage support slide blocks 36 and 37 is the shift bar 32 which has a longitudinally extending central slot 42 and a pair of longitudinally extending short slots 43 approximate to each end thereof. The shift bar 32 is held slidably captive to the carriage support slide blocks by machine screws 44 projected downward through the end slots 43 and into threaded engagement with the slide blocks. Projected downward through the central slot 42 of shift bar 32 is a machine screw 45 threadedly engaged into the top of radiation detector carrier block 40, clearance being maintained to avoid binding between the machine screw and shift bar as the carrier block carries the radiation detector longitudinally of the shift bar.

Fixedly secured upon the upper surface of support slide block 36 is a normally open right hand end limit switch 46 having an actuating arm 47 and a pair of output conductors 48 in series with the switch element of switch 46. Similarly, secured upon the support slide block 37 is a normally open left hand limit switch 49 having actuating arm 50 and a pair of conductors 51 in series with the contacts of the switch 49. Secured to the upper surface of shift bar 32 just inward of the end slots 43 are upstanding brackets 52 and 53 respectively engageable with the switch actuating arms 47 and 50 to close the switches 46 and 49 when the shift bar 32 carries the brackets into engagement with the associated actuating arm, the spacing between the brackets 52 and 53 being less than the spacing between switch actuating arms 47 and 50.

Extending between and secured to the front faces of carriage support slide blocks 36 and 37 is a rigid support block 54 to which is fixedly secured an upstanding bracket 55 proximate to the left hand limit switch 49. The bracket 55 supports a motor mount 56 which carries a drive motor 57 electrically energizable through cable 58 to rotatably drive output gear 59 in the direction indicated by arrow 60 in FIG. 3. Motor output gear 59 is engageable with and drives gear 61 fixed upon a shaft journalled in and extending through support bar 54 and having fixed to its opposite end a chain driving pinion 62. Fixed on a shaft also journalled in support bar 54 and proximate to right hand limit switch 46 is a second pinion gear 63. Trained about the gears 62 and 63 is an endless roller chain 64. As best seen in FIG. 4, one link of chain 64 is secured by a pin 65 to a slide block 66 vertically shiftable in a slide channel 67 cut into the front face of carrier block 40.

Figures 1, 2:
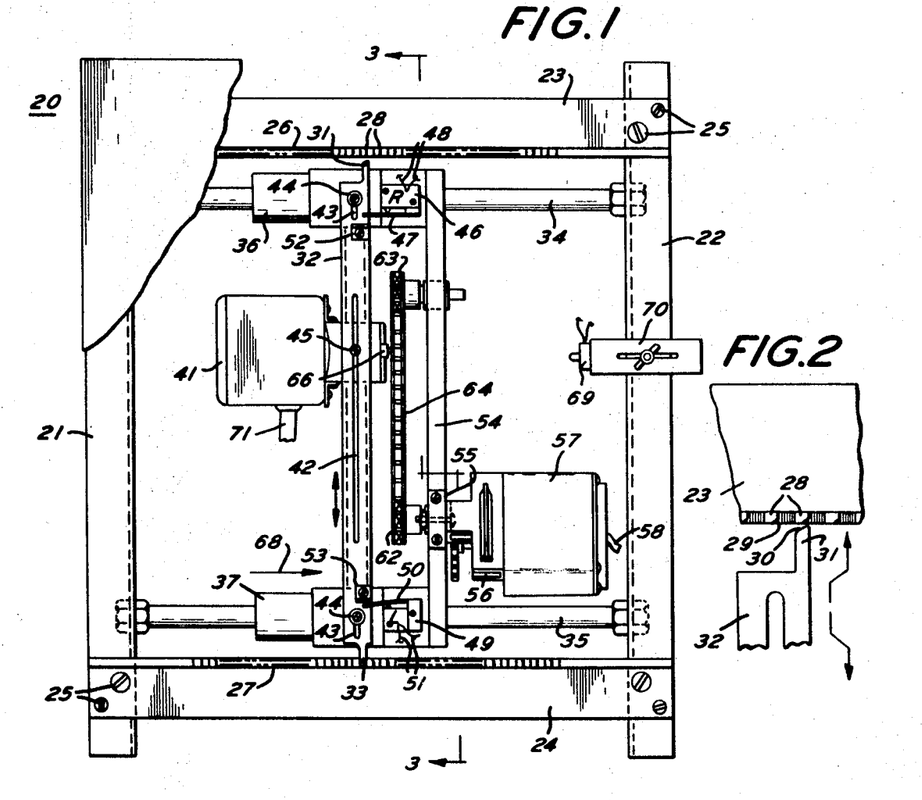
FIG. 1 illustrates in plan view the radiation detector scanning apparatus according to the invention from which the data and control signals to be stored are generated.
FIG. 2 is an enlarged fragmentary view of the carriage shifting rack structure which forms part of the apparatus of FIG. 1.
Figure 3:
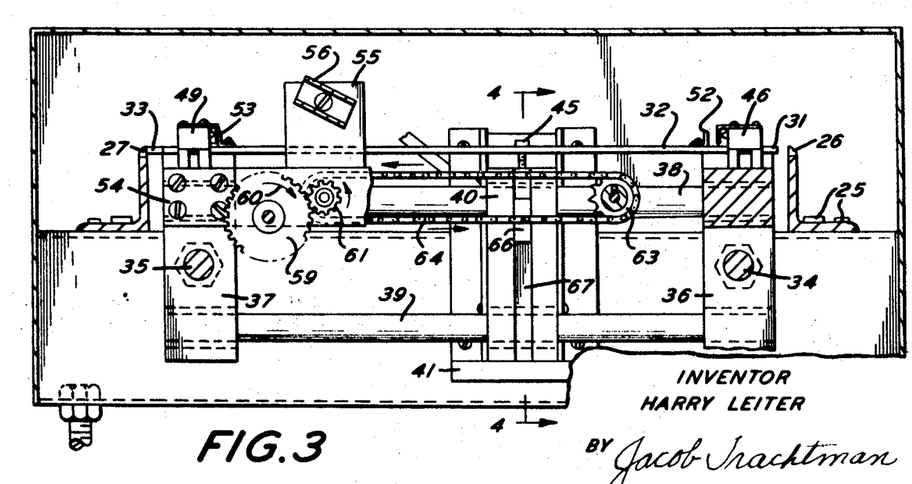
FIG. 3 is a vertical sectional view through the apparatus of FIG. 1 as would be seen when viewed along the line 3—3 thereof.
Figure 4:
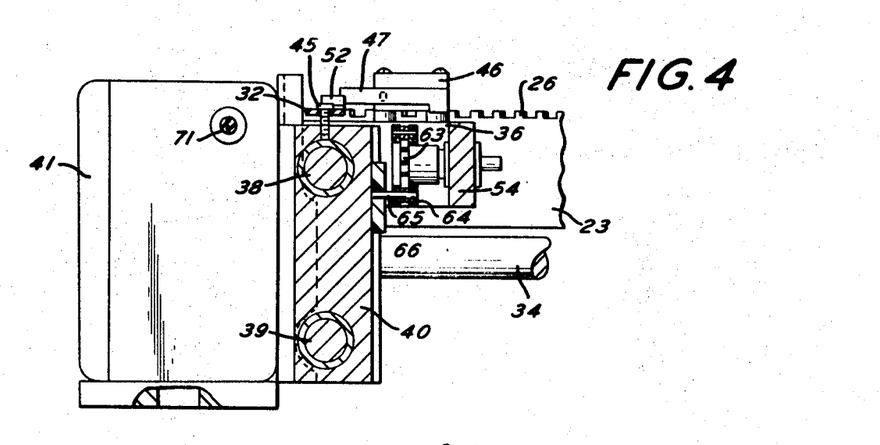
FIG. 4 is a vertical sectional view through the apparatus of FIG. 1 taken at right angles to the view of FIG. 3 and as would be seen when viewed along the line 4—4 of FIG. 3.

As best seen from FIGS. 1 and 3, energization of electric motor 57 causes the lower run of chain 64 to move from left hand limit switch 49 toward right hand limit switch 46 while conversely the top run of chain 64 moves from right hand limit switch 46 toward left hand limit switch 49. Since slide block 66 is pinned to the chain 64, movement of the chain causes carrier block 40 to slide on shafts 38 and 39 toward right hand limit switch 46 until the chain link carrying tie pin 65 moves upward and around pinion gear 63 to the top run thereby carrying slide block 66 upward in slide channel 67. The direction of motion of carrier block 40 is thereupon reversed and it moves with the chain top run toward left hand limit switch 49 until the chain link carrying pin 65 moves downward around pinion gear 62 again to the chain bottom run.

From the foregoing, it will be appreciated that carrier block 40, and hence radiation detector 41, moves at a constant rate first in one direction and then in the other direction while the connecting pin 65 is carried along the top and bottom runs of chain 64, and that the carrier block 40 executes substantially a pause at each end of the chain run while the pin 65 is moving around the gears 62 and 63 from one run of the chain to the other. It is during this pause at each end of the chain run that the carriage, and hence the radiation detector 41 is shifted on shafts 34 and 35 a distance equal to the width of shift bar fingers 31 or 33 so that the subsequent scan of the detector 41 is made along a line immediately adjacent and parallel to the scanned line just completed. Carriage shifting is effected by the shift bar 32 and racks 26 and 27 in the manner best illustrated in the showing of FIG. 1 to which attention should be now directed.

The central slot 42 of shift bar 32 is shorter in length than the end to end extent of chain 64 and it will be observed that the connecting pin 65 carried by slide block 66 is aligned with the machine screw 45 carried by carrier block 40 through the center slot 42. Consequently, when carrier block 40 is moving in the direction of right hand limit switch 46, machine screw 45 abuts the end of central slot 42 before connecting pin 65 comes to the end of the chain run. Since carrier block 40 continues to move toward limit switch 46 until connecting pin 65 reaches its chain end position, machine screw 45 abuts the end of central slot 42 and carries shift bar 32 toward rack 26, withdrawing finger 33 from rack 27 and engaging camming face 30 of finger 31 with the camming face of the opposed rack tooth 28.

The continued drive of shift bar 32 toward the rack 26 causes the camming face 30 of finger 31 to slide to the right along the camming face of the engaged rack tooth and thereby carry the entire carriage in the direction indicated by arrow 68 for a distance equal to the width of finger 31, at which point the finger 31 is disposed between a pair of adjacent rack teeth 28. Since opposite end finger 33 of the shift bar 32 had been previously disposed between a pair of rack teeth in rack 27, it will now be clear that finger 33 is positioned in apposition to the next tooth of rack 27, and when the carrier block 40 has travelled to the opposite end of central slot 42 a carriage shift will again be effected by shift bar finger 33, and so on until the complete scanning pattern has been carried out. The apparatus is shut down by actuation of switch 69 when engaged by advancing support bar 54. Switch 69 is carried by an adjustable support rack at 70 so that the apparatus may be shut down at any desired point between the limits of physical switch adjustment.

Brackets 52 and 53 carried by shift bar 32 are so positioned relative to their respectively associated switch actuating arms 47 and 50 that the bracket engages the actuating arm to close the switch when the connecting pin 65 begins its travel around the pinion gears 62 and 63 and maintains the switch closed for the travel time of the connecting pin about the gear. The switch actuating arms are spring biased and are overdriven by the continued movement of the shift bar carried brackets, the biasing force being sufficient to back shift the shift bar 32 a sufficient distance to permit reopening of the switch contacts when the connecting pin has completed its movement around the pinion gear, the back shifting being insufficient to disengage the shift bar finger from the rack so that mechanical stability of the carriage is maintained. Each of the switches 46 and 49 is thus closed for the time interval during which the connecting pin 65 moves around the proximate pinion gear and thereafter is in an electrically opened condition.

Figure 8:
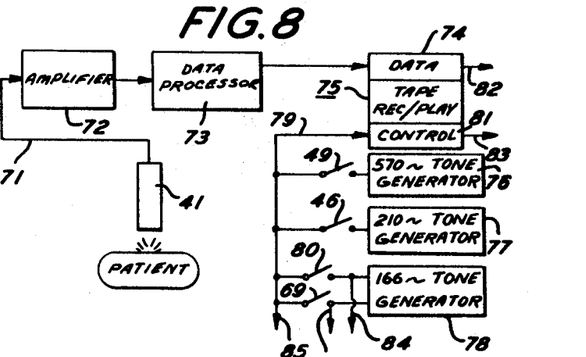
FIG. 8 is a functional block diagram of the apparatus associated with the radiation detector scanning device of FIG. 1 effective to store data and control signals for subsequent use.

Switches 46, 49 and 69 are utilized to generate control signals while data signals are delivered from the radiation detector 41 via cable 71, these elements being identified in the functional block diagram of FIG. 8 to which attention should be now directed. As shown in FIG. 8, the radiation detector 41 generates signals as it scans over the area of interest of a patient, the generated signals being in the form of pulses routed via output lines 71 to amplifier 72. As previously described, the data signals are delivered to amplifier 72 at a rate which varies in accordance with the concentration of radioactive material being then scanned, higher pulse rates corresponding to greater concentrations. The amplified signals are then passed to a data processing device 73 and after processing therein are recorded through one channel 74 of a tape recorder mechanism 75 on one track of a magnetic tape. The amplifier 72 may include threshold and limiting circuits to suppress background radiation and provide pulse shaping if desired.

The particular type of data processing performed by processor 73 will be determined by signal requirements of whatever device is utilized to provide a display of the data to be subsequently read out of the date channel 74. If display apparatus operable directly from pulse rate information is utilized, then the data processor 73 may take the form of additional wave shaping circuitry for providing pulses of desired shape and/or repetition rate limits. Suitable data processing circuitry for this purpose is shown and described in connection with FIGS. 2 and 3 of my copending United States Patent Application Ser. No. 304,050, filed Aug. 23, 1963 and issued on Sept. 27, 1967 as Patent No. 3,275,826 entitled Signal Processing Means for Detected Pulse Signals. Should, on the other hand, the display apparatus be responsive to data signals of varying amplitude then the data processor 73 must be capable of converting pulse rate information to a variable amplitude signal. Apparatus suitable for this purpose is also illustrated and described in connection with FIG. 4 of my previously identified Patent No. 3,275,826 entitled Signal Processing Means for Detected Pulse Signals.

Also shown in FIG. 8 are a 570 cycle tone generator 76, a 210 cycle tone generator 77, and a 166 cycle tone generator 78. Each of the tone generators is coupled to a control signal line 79 through a switch, the generator 76 being coupled thereto by a left hand limit switch 49, the tone generator 77 being coupled thereto by the right hand limit switch 46 and the generator 78 being coupled thereto by stop switch 69. Tone generator 78 is also coupled to the control signal line by a second switch 80 which is a start switch not illustrated specifically in the mechanical showing of FIGS. 1 to 4 but which can be placed at any convenient location. The signals appearing on control signal line 79 are routed through control channel 81 of tape recorder 75 and recorded on a second track of the magnetic tape on which are also recorded the data signals received through data channel 74. The tape recorder 75 may, if desired, be also provided with a monitor head so that the data and control signals just recorded may be read out from output 82 and 83 to concurrently actuate a data display device.

Signal storage takes places in the following manner. Assume that the apparatus of FIG. 1 has been properly placed over the area of a patient to be scanned with the radiation detector 41 approximately opposite the drive motor 57 with connecting pin 65 on the top run of chain 64 positioned just prior to actuation of left hand limit switch 49 by shift bar 32. The start switch 80 is now closed for a predetermined time interval to start the drive motor 57 via conductors 84 and 85 and ultimately cable 50 and also to transmit to the control signal line 79 a pulse of 166 cycle energy from tone generator 78, the pulse being recorded on the control track of the magnetic tape through control channel 81. Start switch 80 opens to terminate the pulse of 166 cycle energy and the radiation detector 41 moves first to the left to close limit switch 49 and generate a 570 cycle control signal which is recorded on the control track of the magnetic tape, and then moves toward right hand limit switch 46, generating data signals which are processed and recorded in the data channel 74 onto the magnetic tape.

When detector 41 reaches the end of its scan, right hand limit switch 46 is closed to thereby record a pulse of 210 cycle energy in the control channel 81 while the detector 41 is being shifted to the next scanning line by the shift bar and rack 26. The next line is then scanned as radiation detector 41 moves from right hand limit switch toward the left hand limit switch 49, the data being processed and recorded again in data channel 74. Actuation of left hand limit switch 49 at the end of the in process scan places a second pulse of 570 cycle energy into the control channel 81 which is recorded on the tape, while the detector is again shifted to the next scanning line. This process continues line after line with the recording of information in the data channel and the recording of alternate pulses of 210 cycles and 570 cycle energy in the control channel. When the scanning has been completed, switch 69 closes to record a final pulse of 166 cycle energy in the control channel, and switch 69 may also be utilized with conductors 85 and 86 to deenergize drive motor 57, and if desired to completely shut down the apparatus. The data and control signals are now recorded on tape and may be used to produce a data display immediately if desired and as often as desired since read out of recorded information is on a non-destructive basis.

Figure 5:
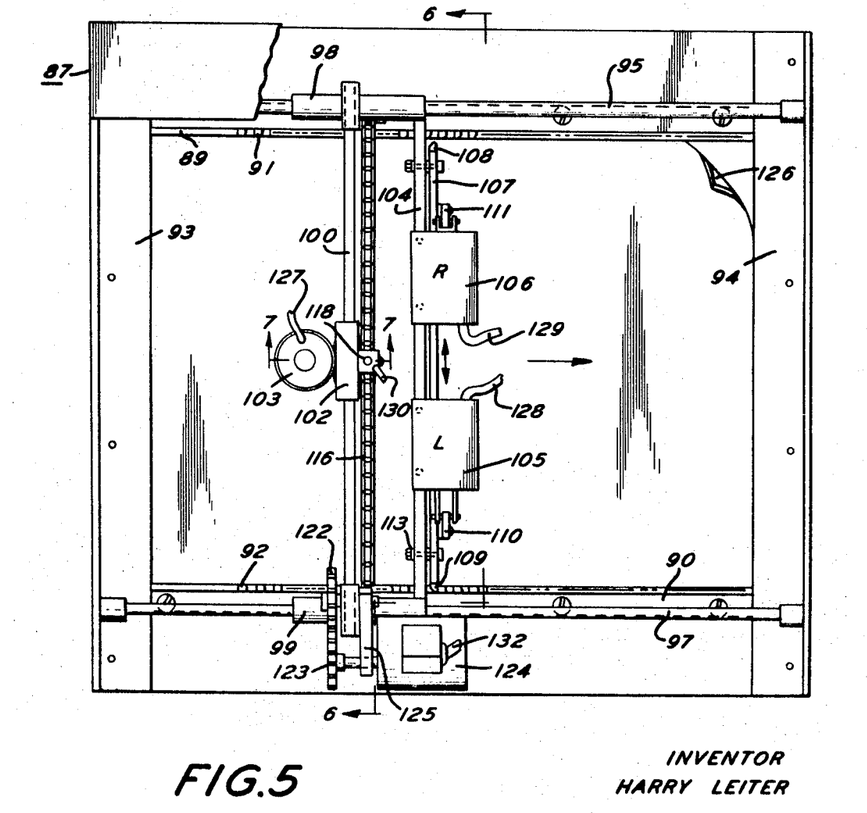
FIG. 5 is a plan view of an intensity modulated scanning light apparatus capable of exposing a photographic film in accordance with the signals generated by the scanning apparatus of FIG. 1.
Figure 6:
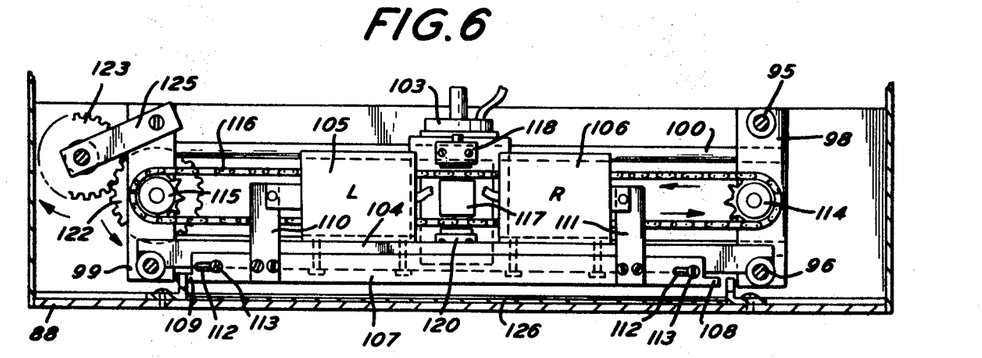
FIG. 6 is a vertical section through the apparatus of FIG. 5 as would be seen when viewed along the line 6—6 thereof.
Figure 7:
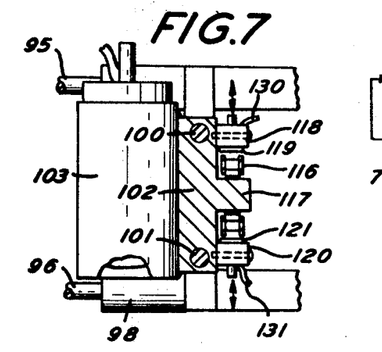
FIG. 7 is a vertical section through the apparatus of FIG. 5 at right angles to the section of FIG. 6 and as would be seen when viewed along the lines 7—7 of FIG. 5.

One apparatus suitable for use with the recorded data stored on the magnetic tape as previously described is illustrated in the showings of FIGS. 5, 6 and 7, this apparatus functioning to expose a photographic film by intensity modulation of a light source in accordance with amplitude variations of the data signal. For this type of device, the data processor 73 of FIG. 8 would be of the digital to analog converter type of circuitry previously mentioned. The play back scanner apparatus 87 comprises a box 88 to the floor of which are fixedly secured a pair of spaced apart angle members 89 and 90 provided with toothed racks 91 and 92 of the same form as already described in connection with the scanning apparatus illustrated in FIG. 1. Extending orthogonally to the angle members 89 and 90 at opposite ends thereof are angle members 93 and 94 having upstanding flanges to which are fixedly secured a pair of vertically spaced parallel extending cylindrical shafts 95 and 96 parallel to and proximate the angle member 89, while a similar shaft 97 parallel to the shafts 95 and 96 but proximate to rack carrying angle member 90 is also fixedly secured at its opposite ends to the upstanding legs of angle members 93 and 94.

Slidably disposed on shafts 95 and 96 is a carriage support slide block 98, while similarly disposed upon shaft 97 is a carriage support slide block 99. Extending between and fixedly intersecuring the carriage support slide blocks 98 and 99 are a pair of vertically spaced parallel shafts 100 and 101 upon which is slidably disposed a carrier block 102 to which is secured for movement therewith a glow modulator 103. The glow modulator 103 is characterized by light output linearly related to the amplitude of signal current input and typically could be a Sylvania type 1130B gas-discharge tube. To the forward ends of the carriage support slide blocks 98 and 99 is fixedly secured the opposite ends of a rigid support bar 104 upon which is fixedly secured an electrically energizable left shift actuator 105 and right shift actuator 106. Positioned beneath the actuators 105 and 106 is a shift bar 107 having opposite end fingers 108 and 109 respectively engageable with the teeth of racks 91 and 92 when the shift bar 107 is shifted longitudinally by the plungers of actuators 105 and 106 to which it is rigidly secured by vertical bars 110 and 111. Shift bar 107 is also provided proximate its opposite ends with end slots 112 through which are projected guide pins or screws 113 secured to support bar 104 and operative to mechanically stabilize the shift bar.

Rotatably journalled to the carriage support blocks 98 and 99 respectively are pinion gears 114 and 115 about which are trained an endless roller chain 116 having upper and lower runs extending parallel to the shaft 100 and 101 upon which carrier block 102 shifts, the carrier block having projecting therefrom an anvil 117 disposed between the upper and lower runs of the chain 116 and in closely spaced relationship thereto. Fixedly secured to the carrier block 102 in closely positioned overlying relation to the top run of the chain 116 is an electrically energizable actuator 118 provided with a downwardly shiftable plunger 119 operative when actuated to drive the plunger downward and clamp the chain top run against the upper surface of anvil 117. Similarly, a lower actuator 120 having a plunger 121 is secured to the carrier block 102 immediately beneath the lower run of chain 116 and is operative when actuated to clamp the lower run of the chain against the undersurface of anvil 117.

Fixed upon the same shaft as pinion gear 115 and rotatable therewith is a gear 122 drivable by a gear 123 fixed upon the output shaft of an electrically energizable motor 124, the motor being physically supported from carriage support block 99 by bracket 125. Disposed flatwise on the floor of the box 88 is a photographic film 126 suitable for variable exposure by the glow modulator 103. Signal current is provided to the glow modulator 103 through electrical cable 127 while control signals are sent to actuators 105, 106, 118 and 120 through cables 128, 129, 130 and 131 respectively, and the motor 124 is energized and deenergized through cable 132.

Figure 9:
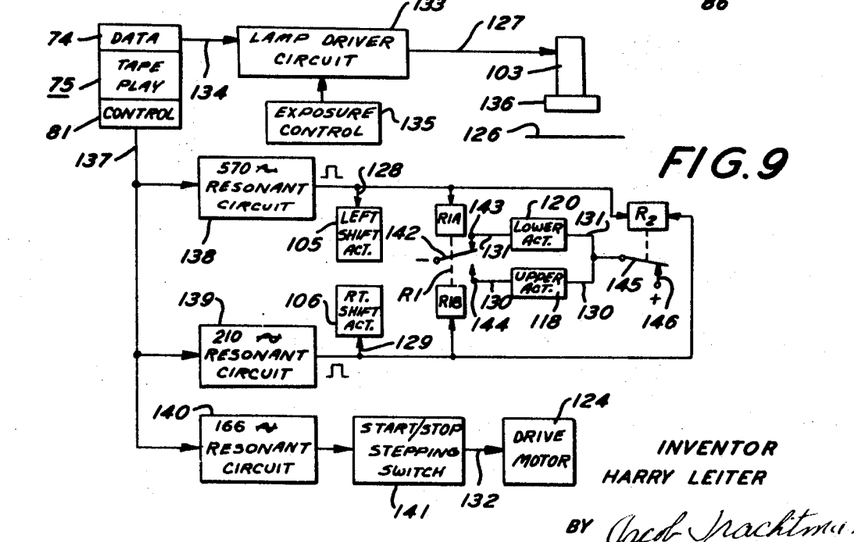
FIG. 9 is a functional diagram, partly in block form and partly in schematic form, operative in conjunction with the apparatus of FIG. 5 to recover the previously stored data signals and utilize the control signals to expose a photographic film in accordance therewith.

The apparatus of FIG. 5 is utilized in conjunction with the circuitry arrangement illustrated in FIG. 9. From FIG. 9 it is observed that the glow modulator 103 receives signals through cable 127 from a lamp driver circuit 133 after the latter has processed the pre-recorded data signals routed to it over line 134 from the data channel 74 of the tape recorder 75 operating in its playback mode. The data signals read out of the tape data channel and into the lamp driver circuit 133 are variable amplitude signals as previously indicated, their power level being increased, expanded or compressed in accordance with the signal current requirements of the glow modulator 103 for purposes of producing a proper exposure of film 126. Operation of the lamp driver circuit 133 is controlled by exposure control 135 which may in a simple case be an amplifier bias control. The light output from glow modulator 103 is focused to the desired resolution in the film plane by a focusing device 136.

The recorded control signals are read out of control signal channel 81 of the tape unit 75 to an output line 137 connected to the signal input terminals of frequency selective resonant circuits 138, 139 and 140 which permit the passage therethrough of only that control signal of the indicated frequency. As shown, the resonant circuits 138, 139 and 140 permit the passage therethrough respectively of signal frequencies of 570 cycles, 210 cycles and 166 cycles. These resonant circuits may also include power amplifiers if required to drive the circuitry connected to the output terminals thereof.

The 166 cycle resonant circuit 140 will pass control signals only at the beginning and the end of the playback operation since these frequencies are only generated by the data collection apparatus when the start switch and stop switch are closed as indicated from FIG. 8. The output of circuit 140 drives a start/stop stepping switch 141 which has its contacts arranged so that alternate ones energize the drive motor 124 and intermediate ones deenergize the drive motor. Thus, the first pulse of 166 cycle energy steps switch 141 to energize the drive motor 124 at the beginning of the playback operation, and the final 166 cycle signal on the tape steps switch 141 to its next position to deenergize the drive motor 124 and terminate the read out scan.

The output pulses from the 570 cycle and 210 cycle resonant circuits 138 and 139 are utilized to actuate the left shift actuator 105 and right shift actuator 106 to produce carriage shift and move the glow modulator 103 to successive scanning lines, the outputs from these circuits also selectively actuating the upper and lower chain clamping actuators 118 and 120 to selectively clamp either the chain upper run or the chain lower run against the anvil and carrier block 102 to thereby cause the glow modulator 103 to traverse a scanning line while it is receiving data signal information for exposure of the underlying film 126. The upper and lower actuators 118 and 120 are not directly actuator by the resonant circuits 138 and 139 for two reasons.

First, it will be recalled that the pulses of signal energy recorded in the control signal channel from the tone generators 76 and 77 of FIG. 8 only exist during the time when the radiation detector apparatus undergoes its pause at the end of each scanning run. Consequently, the pulse energy if delivered to the actuators directly would only actuate them at precisely the times when it is desired to stop scanning motion of the glow modulator and would not actuate them during the scan time. Consequently, no scanning would occur. Secondly, it is desired that the glow modulator 103 stops scanning at the end of each scanning line during the time of carriage shift from the completed scan line to the next line about to be scanned. In this manner the movements of the glow modulator are synchronized with movements of the radiation detector of the data-collecting apparatus. In substance then, it is desired to selectively actuate the upper and lower chain clamping actuators 118 and 119 in the time interval between 210 cycle and 570 cycle control pulses, and to deactuate both of these actuators in the presence of either control pulse.

This is accomplished by employing a latching type relay designated in FIG. 9 as having two coils R1A and R1B both of which are coupled to the pole 142 for transferring the latter between contacts 143 and 144, and a relay R2 non-selectively energizable by control signals from either of the circuits 138 and 139 and effective when energized to break the circuit between normally closed pole 145 and contact 146. Contact 146 of relay R2 is connected to a source of positive potential while pole 142 of relay R1 is connected to a source of negative potential so that lower actuator 120 is energized whenever relay R2 is deenergized and when pole 142 is engaged with contact 143, all as illustrated in FIG. 9. Similarly, upper actuator 118 is energized when relay R2 is deenergized and pole 142 is engaged with contact 144. Thus, the selection of upper or lower actuator 118 or 120 is controlled by the latching relay R1, and energization of these actuators is controlled by the state of relay R2, both actuators being deenergized when R2 is energized to disengage pole 145 from contact 146 while the selected actuator is energized when relay R2 is deenergized.

With the foregoing in mind, operation of the apparatus of FIG. 5 by the prerecorded tape signals reading out of tape recording unit 75 is as follows. With the glow modulator 103 positioned at the drive motor end of its carriage, the tape unit is put into operation and the first recorded 166 cycle energy pulse passes through resonant circuit 140 to actuate stepping switch 141 and start the drive motor 124. The first 570 cycle control signal occurs next and energizes less shift actuator 105, relay R2 and coil R1A of latching relay R1. Energization of left shift actuator 105 shifts the carriage one scanning line. Energization of coil R1A insures that pole 142 engages contact 143 to energize lower chain drive actuator 120 as soon as the control pulse terminates and deenergizes relay R2. Lower actuator 120 clamps the lower chain run to carrier block 102 and initiates scanning of glow modulator 103 across the film and exposure of the latter by the data signals being delivered to the glow modulator.

Scanning continues until the 210 cycle energy pulse is received at the end of the first scanning line. This pulse energizes right shift actuator 106 to step the carriage to the next scanning line, energizes relay R2 to deenergize the chain clamping lower actuator 120, and energizes coil R1B of latching relay R1 to disengage pole 142 from contact 143 and engage the pole with contact 144 and thereby condition upper chain clamping actuator 118 for energization at the termination of the 210 cycle pulse when R2 will again be deenergized. At termination of this pulse the carrier block 102 is clamped to the upper chain run by actuator 118 and glow modulator begins its second scan in the reverse direction to the first scan. This operation continues repetitively until all of the data has been read out and the 166 cycle stop signal appears on the control signal output line 137, passes through resonant circuit 140 and steps switch 141 to its next position thereby deenergizing drive motor 124 and terminating the read out operation. The film 126 may then be photographically processed to obtain a finished print of the data. Should an underexposure or overexposure of the film have occurred, a new run may be immediately made with a corrected exposure condition made by adjustment of exposure control 135.

Figure 10:
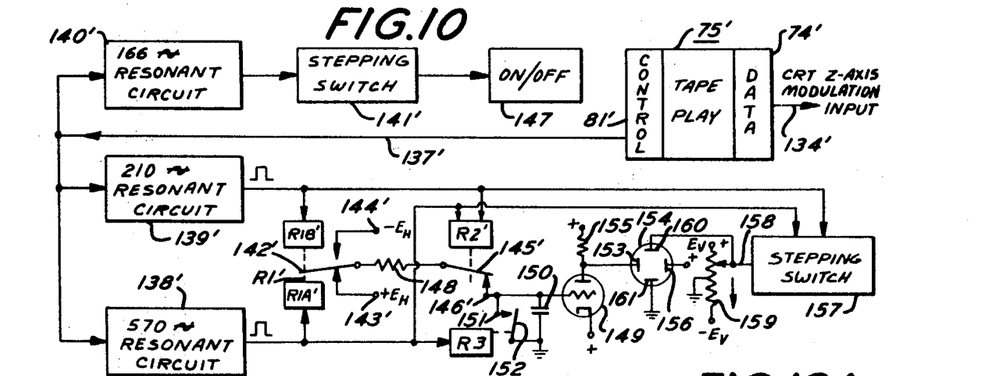
FIG. 10 is a functional diagram, partly in block representation and partly in schematic form, of cathode ray tube control and display apparatus operative to display the stored data.

Another form of playback apparatus eliminates the mechanical scanning device of FIG. 5 and utilizes in its stead the display properties of a cathode ray tube, such a system being illustrated in diagrammatic form in the showing of FIG. 10. In general, the system of FIG. 10 utilizes the stored data signals to modulate the cathode ray tube beam current and thereby vary the intensity of the light spot produced on the face of the tube, and utilizes the control signals read out of control channel 81 of the tape unit 75 to provide the desired scanning pattern for the cathode ray tube beam. The cathode ray tube display is used to expose a photographic film by any of the standard techniques of cathode ray tube photography. Comparison of FIG. 10 with FIG. 9 discloses that a substantial part of the circuitry of FIG. 9 is directly utilizable with the circuit arrangement of FIG. 10, the mechanical actuators of the FIG. 5 apparatus being of course dispensed with and being replaced by electrical potentials operative in the usual manner to cause deflection of the cathode ray tube beam in the desired fashion. Those elements of FIG. 10 which are identical to elements of FIG. 9 are designated by the same reference character but are provided with a superscript prime.

The data signals are read out of data channel 74' over signal line 134' to the cathode ray tube Z-axis modulation input circuit, while the control signals are read out of control channel 81' to control signal output line 137' from which the control signals are distributed to the resonant circuits 138', 139' and 140'. Occurence of the 166 cycle signal passes a pulse of energy through circuit 140' to stepping switch 141' which on the first pulse actuates the on/off circuit 147 to turn the system on, and on the final 166 cycle pulse actuates the circuit 147 to turn the system off. The on/off circuitry may carry out whatever functions are desired, as for example, the on condition of the circuit may either energize the system, or alternatively, in a system separately energizable may control the cathode ray tube blanking circuit to permit turn-on of the beam and may also be used to jam the deflection circuits to a predetermined condition corresponding to the desired starting point of the cathode ray tube beam at the beginning of a read out operation.

The 570 cycle and 210 cycle control signals respectively actuate coils R1A' and R1B' of relay R1' to cause the pole 142' to respectively engage contacts 143' and 144', these contacts being now respectively coupled to source of DC potential $+E_H$ and $-E_H$. Relay R1' pole 142' is connected through a resistor 148 to pole 145' of relay R2', contact 146' engaged by this pole being connected to the grid of electron tube 149, to one terminal of capacitor 150 and to contact 151 of relay R3. The remaining terminal of capacitor 150 is connected to pole 152 of relay R3 and to ground reference potential. The anode of electron tube 149 is directly coupled to one of the horizontal deflection plates 153 of the cathode ray tube 154 and is returned to a source of positive potential through a plate load resistor 155. The cathode of electron tube 149 is also returned to a source of positive potential, as is the other horizontal deflection plate 156 of cathode ray tube 154.

As will be seen, the lowest potential of the grid of electron tube 149 occurs when relay R3 is energized to engage its contact 151 and pole 152 to thereby short-circuit capacitor 150 and ground the grid. Since this is the lowest potential condition of the grid it must represent minimum anode current condition and consequently the highest potential condition of horizontal deflection plate 153. The positive potential condition of horizontal deflection plate 156 is therefore selected to cause positioning of the electron beam at the left hand side of the cathode ray tube face under grounded grid conditions of the electron tube 149. The cathode potential of electron tube 149 is chosen so that the maximum positive excursion of the grid does not drive the tube into grid current conditions and non- linearize the grid plate transfer characteristic. The maximum positive potential of the electron tube grid causes minimum potential at the anode and drives the horizontal deflection plate 153 below the potential of plate 156 to a sufficient extent to deflect the cathode ray tube electron beam to the desired right hand screen position.

Vertical deflection of the electron beam at the end of each scan is produced by stepping switch 157 which shifts contact arm 158 along a resistive potential divider 159 from a positive potential $+E_V$ successively downward toward a final potential $-E_V$. Since upper vertical deflection plate 160 of cathode ray tube 154 is directly connected to stepping switch contact arm 158, and since lower vertical deflection plate 161 is clamped to ground reference potential, the potential of deflection plate 160 is observed to be variable between potential limits operative to provide beam scanning from top to bottom of the cathode ray tube screen in incremental steps selectable in number and degree of deflection. Operation of the circuit of FIG. 10 proceeds as follows, step by step condition changes being illustrated in FIGS. 11 and 12 which should be also referred to.

Figure 11A:
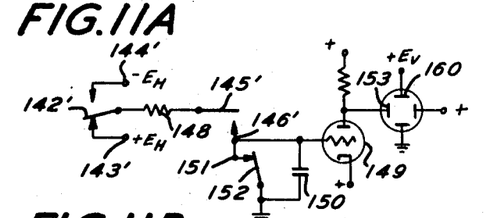
FIGS. 11A through 11D represent a portion of the circuitry of FIG. 10 illustrating circuit conditions at different times during the display process to show the manner of scanning the cathode ray tube beam in correspondence with the scanning movements of the recording apparatus.

Assume that the first 166 cycle signal has been read out of the control channel 81', that the equipment responses thereto have taken place, and that the first 570 cycle signal has passed through circuit 138' to energize relays R2', R3, coil R1A' of latching relay R1', and has stepped switch 157 to its first position at $+E_V$. At this time the circuit conditions are as illustrated in FIG. 11A wherein pole 152' is engaged with contact 143' so that potential $+E_H$ appears at pole 145' disengaged by energization of relay R2' from its associated contact 146', and pole 152 has been pulled into engagement with its contact 151 to ground the grid of electron tube 149. Horizontal deflection plate 153 is therefore at its highest potential as is vertical deflection plate 160, so that the cathode ray tube electron beam appears on cathode ray tube screen 154a at the upper left hand corner designated as 162 in the showing of FIG. 12A.

Figure 11B:
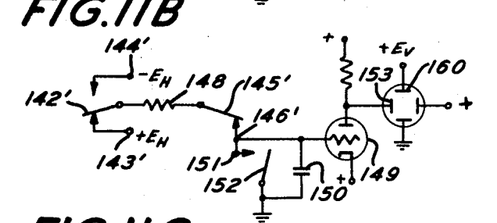
Figure 11C:
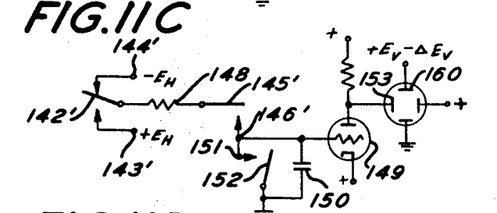

At the termination of the 570 cycle control signal, relays R2' and R3 are deenergized causing poles 145' and 152 to respectively make and break engagement with their contacts 146' and 151 as shown in FIG. 11B. With the short-circuit removed from capacitor 150, the capacitor begins to charge through resistor 148 toward potential $+E_H$. The grid of electron tube 149 thus starts to move more positive, increasing the anode current and pulling down the potential at the deflection plate 153. The cathode ray tube electron beam thus begins to scan horizontally and moves from the left hand side of the screen at position 162 toward and finally arriving at right hand screen position designated 163 in the showing of FIG. 12B. During this scan time, the data signals from channel 74' have been modulating the beam current to vary the light intensity on the cathode ray tube screen.

Figure 12A:
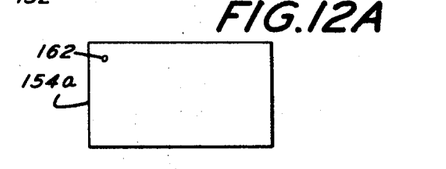
FIGS. 12A through 12D illustrate the electron beam scanning of the cathode ray tube and correspond respectively to the circuit conditions illustrated in FIGS. 11A through 11D.
Figure 12B:
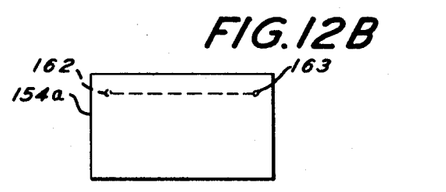
Figure 12C:
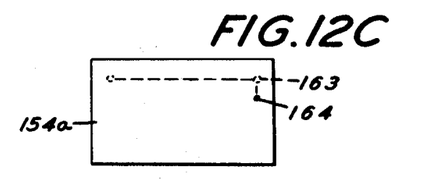

When the beam has arrived at position 163, a 210 cycle control pulse passes through circuit 139' to energize relay R2', coil R1B' of latching relay R1', and step switch 157 to its next lower potential point. The potential on vertical deflection plate 160 is therefore reduced by $\Delta E_V$ and the beam position shifts vertically downward from 163 to position 164 as illustrated in FIG. 12C, the horizontal deflection circuit condition being now illustrated in FIG. 11C. Energization of relay R2' again disengages pole 145' from contact 146' while energization of relay coil R1B' transfers pole 142' from contact 143' to contact 144' and therefore places the potential $-E_H$ at pole 145'. Since relay R3 is not energized by the 210 cycle pulse, its pole 152 remains open so that the potential on capacitor 150 remains unchanged and no horizontal movement of cathode ray tube beam occurs.

At the termination of the 210 cycle pulse, relay R2' is again deenergized and pole 145' engages contact 146' so that the positive charge on capacitor 150 begins to discharge through resistor 148 toward the potential $-E_H$.

Figure 11D:
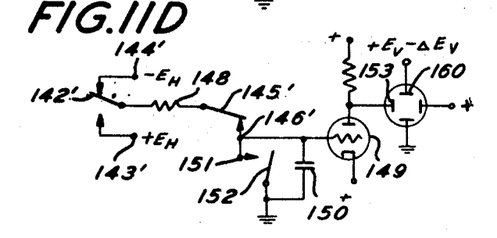
Figure 12D:
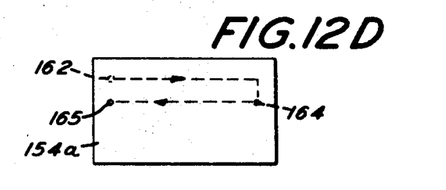

The grid potential of electron tube 149 therefore begins to fall linearly and allow the anode potential to rise, and cause the cathode ray tube electron beam to scan horizontally in reverse direction from the position 164 over to the left and ultimately to position 165 at the left hand side of the screen immediately beneath its initial starting position 162 as observed in the showing of FIG. 12D, the circuit conditions being seen in FIG. 11D. At this point the next 570 cycle control signal appears and reestablishes the horizontal circuit conditions shown in FIG. 11A, the vertical circuit conditions being again changed to step the beam downward to the next scanning line. The foregoing described process continues until the entire data pattern has been displayed and the final 166 cycle terminating control pulse has been transmitted to circuit 140'. This pulse then actuates the stepping switch 141' which in turn terminates the operation by deactuating on/off control circuit 147. Such deactuation may consist merely of turning off the cathode ray tube beam current via the usual retrace blanking circuit, or may be used to shut down the entire apparatus if desired.

Having now described my invention in connection with particularly illustrated embodiments thereof, variations and modifications of my invention may now occur from time to time to those persons normally skilled in the art without departing from the essential scope or spirit of my invention, and accordingly it is intended to claim the same broadly as well as specifically as indicated by the appended claims.

What is claimed is:

1. Apparatus for carrying a condition responsive device through a predetermined scanning pattern over an area to be scanned, comprising in combinatiton,
    (a) a carrier member to which said condition responsive device may be secured for motion therewith,
    (b) a carriage on which said carrier member is mounted for shifting movement therealong in opposite directions,
    (c) a frame on which said carriage is mounted for stepped movement transversely to the path of shifting movement of said carrier member on said carriage,
    (d) carrier member drive means on said carriage operative to shift said carrier member therealong as aforesaid, and coupling means effective to couple said carrier member to said drive means,
    (e) carriage stepping means associated partly with said carriage and partly with said frame operative when actuated to step said carriage transversely to the shifting movement directions of said carrier member on said carriage as aforesaid in fixed increments, each stepped transverse movement being in the same direction for scanning a predetermined area, and actuating means operative to actuate said carriage stepping means at the end of each shifting movement in at least one of said opposite directions by said carriage.

2. The apparatus as set forth in claim 1 wherein said carriage stepping means comprises at least one elongated toothed rack having a plurality of uniformly spaced in-line teeth, each of which is provided with a camming face the plane of which is transversed to both the direction of carrier member shifting movement and the direction of carriage stepping movement, and a shift bar having a finger extending therefrom provided with a camming face at its free end the plane of which camming face is parallel to the camming face of said rack teeth, said shift bar being supported for shifting movement transversely to the line of rack teeth such that when shifted toward said teeth the camming surface of said finger surface engages the camming face of an opposed rack tooth to thereby shift said rack and shift bar relative to one another, the width of said shift bar finger being slightly less than the space between adjacent rack teeth so that said finger may enter therebetween when the said camming faces slide past and out of contact with one another.

3. The apparatus as set forth in claim 2 wherein, said at least one toothed rack is fixedly secured to said frame, said shift bar is supported on said carriage for movement therewith, and said carriage stepping means actuating means is supported by said carriage and when rendered operative shifts said shift bar into engagement with said toothed rack.

4. The apparatus as set forth in claim 2 wherein, said at least one toothed rack is fixedly secured to said frame, said shift bar is supported on said carriage for movement therewith, and said carriage stepping means actuating means is supported by said carriage and when rendered operative shifts said shift bar into engagement with said toothed rack, said shift bar when shifted by said actuating means being effective to operate signal control means carried by said carriage.

5. The apparatus as set forth in claim 2 wherein, said at least one toothed rack is fixedly secured to said frame, said shift bar is supported on said carriage for movement therewith, and said carriage stepping means actuating means is supported by said carriage, and when rendered operative shifts said shift bar into engagement with said toothed rack, said actuating means comprising electrically energizable means.

6. The apparatus as set forth in claim 1 wherein said carrier member drive means is a continuously moving elongated endless loop having parallel extending runs moving in opposite directions, and said coupling means is fixedly connected to said loop for movement therewith and shiftably connected to said carrier, whereby said carrier is shifted first in one direction and then in the opposite direction as said loop carries said coupling first along one loop run and then along the oppositely moving loop run.

7. The apparatus as set forth in claim 1 wherein said carrier member drive means is a continuously moving elongated endless loop having parallel extending runs moving in opposite directions, and said coupling means comprises electrically energizable means operative to lock said carrier to a selected one of said loop runs whereby to shift said carrier in the direction of the loop run to which said carrier has been locked.

References Cited
UNITED STATES PATENTS

| | | | |
|---|---|---|---|
| 2,520,187 | 8/1950 | Wilhusen et al. | 74—37 |
| 3,029,649 | 4/1962 | Steyh | 74—37 |
| 3,247,454 | 4/1966 | Gale et al. | 74—37X |

MILTON KAUFMAN, Primary Examiner

U.S. Cl. X.R.

74—37